June 7, 1932.   R. J. KEHL   1,862,055
BLOWPIPE
Filed July 22, 1926
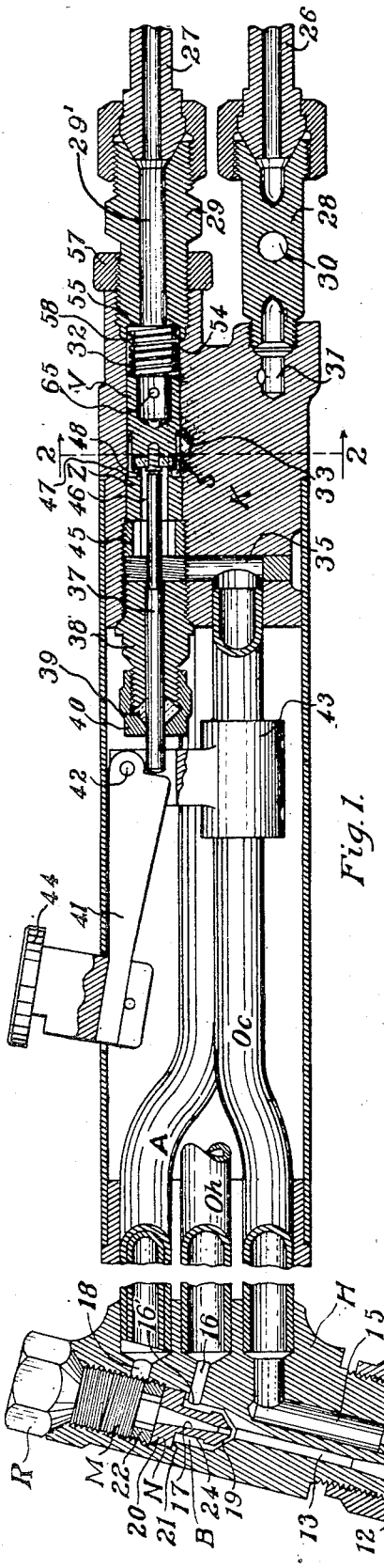
Fig. 1.
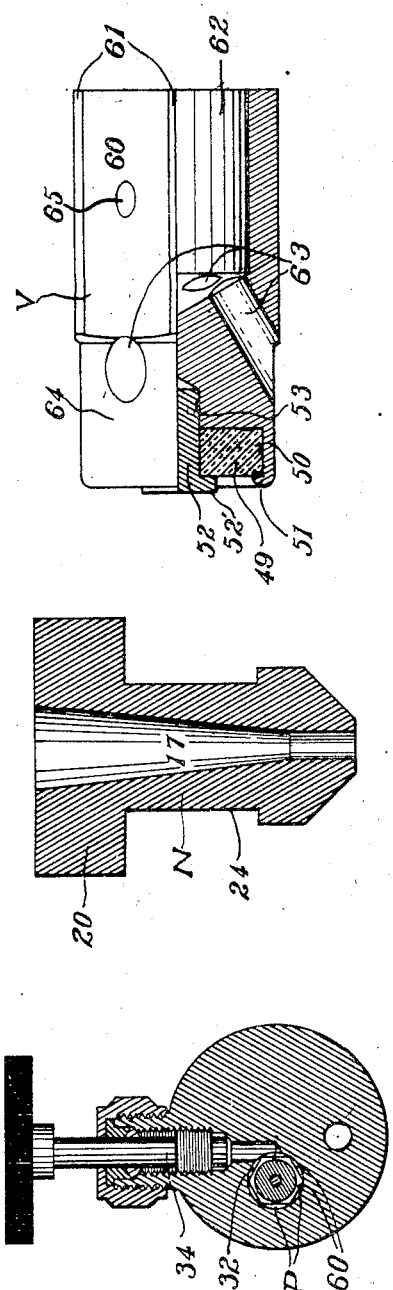
Fig. 3.
Fig. 4.
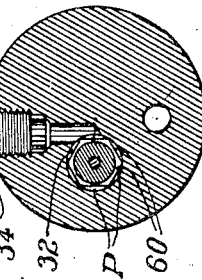
Fig. 2.
INVENTOR:
Robert J. Kehl,
BY
ATTORNEYS.

Patented June 7, 1932

1,862,055

UNITED STATES PATENT OFFICE

ROBERT J. KEHL, OF NEWARK, NEW JERSEY, ASSIGNOR TO OXWELD ACETYLENE COMPANY, A CORPORATION OF WEST VIRGINIA

BLOWPIPE

Application filed July 22, 1926. Serial No. 124,259.

This invention relates to blowpipes adapted to utilize oxygen and acetylene or other suitable gases for cutting metals.

In the operation of such blowpipes, the metal to be cut is first heated by means of a high-temperature flame produced by a mixture of oxygen and a fuel gas such as acetylene, whereupon a jet of oxidizing gas such as oxygen under pressure is directed onto the heated area, thereby rapidly oxidizing the heated metal and producing the cut. The present invention relates particularly to an improved means for mixing the heating gases, and to an improved means for controlling the oxidizing or so-called cutting gas.

The objects and novel features of the invention will be apparent from the following description taken with the accompanying drawing, wherein Fig. 1 is a longitudinal sectional view of a blowpipe embodying my invention;

Fig. 2 is a cross-sectional view of the same, taken on the line 2—2 of Fig. 1;

Fig. 3 is a view of the improved mixing nozzle; and

Fig. 4 is a view of the improved valve for the cutting oxygen control nozzle.

As shown, the improved blowpipe may consist of suitable gas pipes $Oc$, $Oh$, and $A$ which carry a head H and a tip T at their forward ends and have a gas inlet casting K secured to their rear ends. The heating gas mixture issues from drillings 10 in the tip, which is coupled to the head by a suitable nut 11 and has a distributing groove 12 that registers with a corresponding groove 12' in the head. The groove 12 communicates with a mixture passage 13 which receives acetylene from a mixer nozzle N and oxygen from a chamber B surrounding the forward end of this nozzle, the acetylene and oxygen being delivered to the passage 13 at about the same pressure. The cutting oxygen issues from a center tip drilling 14 that communicates with a head passage 15 into which the pipe $Oc$ discharges.

The chamber B receives oxygen through a lateral passage 16 that communicates with the oxygen pipe $Oh$; and the nozzle passage 17, which is axially in line with the passage 13, receives acetylene from a chamber M that has a lateral inlet passage 18 which communicates with the acetylene pipe A. The front end of the nozzle and the bottom of the chamber B are correspondingly tapered so that a tapering narrow annular passage 19 is provided between them to discharge oxygen into the fuel gas jet from the nozzle at the entrance of the passage 13. The rear end of the nozzle has a base or flange 20 that engages a shoulder 21 formed at the bottom of the chamber M, whereby the nozzle may be accurately set in place relatively to the sides and tapered bottom of the chamber B. The nozzle may be secured in place by a locking screw 22 which is threaded to fit corresponding threads in the wall of chamber M, and the nozzle and screw may be removed after unscrewing a threaded plug R that normally closes the chamber M.

It is important that the oxygen entering the chamber B shall be evenly distributed entirely around the nozzle so that there will be a uniform flow of oxygen through all parts of the narrow passage 19 to the entrance of the mixing passage 13. To this end, the part of the chamber B adjoining the outlet orifice 16' of the passage 16 is enlarged circumferentially of the nozzle N, as by reducing the cross-sectional size of the nozzle by cutting a wide annular or circumferential groove 24 therein opposite the orifice of the passage 16. As shown, this circumferential groove desirably extends from the flange 20 or above the orifice 16' to a point well below said orifice so that an enlarged annular gas space, wider radially than the passage 19, is formed to receive gas from the passage 16. This space is preferably and more easily formed by grooving the outside of the nozzle, but may also be formed by cutting a corresponding wide circumferential groove in the inner wall of the chamber B in the plane of the orifice 16'.

The fuel gas such as acetylene and the oxidizing gas such as oxygen may be supplied to the blowpipe from suitable sources, as from cylinders containing such gases which are connected by hoses to the hose connections 26 and 27, respectively. These hose connections may be secured to the casting K by couplings 28, 29; the former carrying a needle valve (not shown) at the passage 30 controlling the flow of acetylene to a passage 31 which communicates with the acetylene pipe A. The oxygen discharges from a passage 29′ in the coupling 29 into a valve chamber 32 from which part of such oxygen may be delivered through a lateral passage 33 past a needle valve 34 to the heating oxygen pipe O$h$.

The supply of cutting oxygen from the chamber 32 through a lateral passage 35 to the pipe O$c$ is controlled by a valve V that is arranged to be opened by a valve stem 37 reciprocable in a guide 38 which is threaded in and closes one end of the chamber 32. The outer end of the stem 37 extends through a suitable packing 39 and a packing nut 40, and is engaged by an operating lever 41 pivoted at 42 on a bracket 43 and provided with a thumb piece 44.

The stem 37 has an inner end which projects axially through a threaded locking screw 45 and into the gas passage 46 of a valve nozzle Z that is held against a shoulder 47 and between the valve V and passage 35 by said screw. The inner end of the stem 37 is of reduced diameter so as to leave gas passages of adequate size through the nozzle and screw. The entrance end of the nozzle is provided with an annular rim 48 spaced from the wall of the valve chamber 32 and is engageable by a washer or seating member 49 of rubber or other suitable material carried by the valve V. The washer 49 is held in a recess 50 of the valve body by the inwardly turned annular wall 51 of said recess and also by a metal pin 52 that is secured in a central socket 53 in the valve body. The pin 52 has a head 52′ that overlaps the inner edge of the washer 49 and provides a metallic abutment for the extreme inner end of the stem 37. Normally, that is to say, when the lever 41 is released or free, the washer 49 is held tightly against the nozzle rim 48 by a helical spring 54 and by the oxygen pressure back of the valve. The spring 54 bears against the rear end of the valve and against the bottom of a spring seat formed by a counterbore 55 in the front end of the coupling 29. The valve V and spring 54 are readily removable by unscrewing the coupling 29 which is normally locked in place by a nut 57 and makes a gas-tight seal at 58 with the valve chamber.

The valve body is multi-sided so as to provide a number of longitudinal gas passages P between it and the cylindrical wall of the valve chamber 32. As shown, the valve body preferably has six sides 60, adjoining sides being separated by longitudinal bearing faces 61 having a transverse curvature corresponding to that of the valve chamber wall. One or more of the gas passages between the valve body and chamber wall communicate with the lateral heating oxygen passage 33 so that the valve V in no way interferes with the flow of the heating oxygen.

Moreover, all of the pasages P deliver oxygen to the gas space S adjoining the nozzle Z and washer or seating member 49, but under some service conditions these passages and the gas space S are not of sufficient size to carry the desired volume of oxygen for cutting purposes. Therefore, to increase the capacity of the blowpipe, a cavity 62 is drilled axially into the rear end of the valve body and a number of inclined holes 63 are drilled from the bottom of this cavity forwardly and outwardly through the valve body. As shown, there are six of these holes 63, centrally arranged with respect to the six sides 60 and providing additional gas passages leading past the valve to the nozzle Z. In order to increase the size of the gas space at the approach to the nozzle Z and to provide a better outlet for the holes 63, the forward end of the valve body is reduced in diameter, as by turning down its peripheral surface for a substantial distance back from the edge 51, to provide the annular relief section 64, into which the forward ends of the holes 63 open. The cavity 62, holes 63 and relief section 64 greatly increase the cross-sectional passage area for gas flowing past the valve V to the nozzle Z and thus provide a cutting blowpipe valve of greater capacity without increasing the size of any of the parts. A hole 65 may be drilled through the side wall of the cavity 62 to receive a hook or other tool used to remove the valve from its chamber.

The operation of the improved blowpipe will be obvious from the foregoing description. By opening the valve at 30 and valve 34 in the passage 33 acetylene and oxygen will be admitted to the pipes A and O$h$, and delivered by the latter through the nozzle N and passage 19 to the mixing passage 13, where the heating gas mixture is produced and discharged through the drillings 10 in the tip. After the issuing jets have been lighted and the metal to be cut has been heated to the proper temperature, the button 44 is depressed and the valve V is unseated, admitting the cutting oxygen in sufficient volume and at proper velocity to the pipe O$c$ from which it is delivered through the passage 15 to the tip drilling 14 and then discharges at the proper velocity to perform the required cutting operation.

While a typical blowpipe is shown for the purpose of illustrating my invention, it will be understood that any or all of the improvements herein disclosed may be embodied in other types of blowpipes, gas control or gas mixing devices and that the details of such improvements may be varied without departing from the spirit of my invention or sacrificing any of its advantages.

I claim:

1. The combination of a valve chamber having end and lateral outlets, a valve in said chamber having a seating member at one end cooperating with said end outlet, gas passage means extending longitudinally of said valve in communication with said lateral outlet and adapted to communicate with said end outlet, and means for operating said valve.

2. The combination with a valve chamber having an outlet, of a valve normally closing said outlet and reciprocable in said chamber, said valve having a seating member cooperating with said outlet, gas passage means around the body of said valve and gas passage means through said body adapted to communicate with said outlet when the valve is unseated, and means for operating said valve.

3. The combination of a valve chamber having an outlet, and a valve in said chamber normally closing said outlet and having a seating member cooperating with said outlet, said valve having a reduced section adjacent said member and passage means around its body and through its body opening into said reduced section.

4. The combination of a cylindrical valve chamber having an outlet, a reciprocable valve in said chamber having a seating member at one end cooperating with said outlet, said valve having a cylindrical reduced section adjacent said member and a multi-sided section between said reduced section and the other end of the valve, passage means through the body of said valve opening into said reduced section, and means for operating said valve.

5. In a blowpipe, a valve chamber, a nozzle having a rim at its inlet projecting into said chamber, a valve in said chamber having a seating member at one end cooperating with said rim, said valve having a peripheral reduced section adjacent said member, a cavity in the opposite end of the body of said valve, passages extending from said cavity outwardly through said body to said reduced section, and means extending through said nozzle to operate said valve.

6. In a metal cutting blowpipe, a cylindrical valve chamber having a lateral outlet, an oxygen supply pipe coupled to one end of said chamber and having a spring seat, an outlet nozzle having a rim at its inlet projecting into said chamber, a reciprocable valve in said chamber having a seating member at one end cooperating with said rim and a metallic abutment centrally of said member, said valve having a peripherally reduced cylindrical relief of section encircling said member and a multi-sided section between said reduced section and the other end of the valve, said multi-sided section cooperating with the valve chamber wall to provide oxygen passages leading to said lateral outlet and to the gas space formed by said relief section, said valve also having a cavity in said other end thereof and inclined gas passages extending outwardly from the bottom of said cavity to said relief section, a spring between said spring seat and said other end of the valve, a valve operating stem extending through said nozzle and adapted to engage said abutment, and means for actuating said stem to unseat said valve against the pressure of said spring.

7. A valve having a seating member at one end, a reduced section encircling said member, a multi-sided section between said reduced section and the other end of said valve, and gas passage means extending through the body of said valve to said reduced section.

8. A cutting blowpipe valve comprising a seating member at one end, a relief section adjacent said member, and gas passage means extending through said valve comprising a plurality of holes in the body of said valve opening into said relief section.

In testimony whereof, I affix my signature.

ROBERT J. KEHL.